(12) United States Patent
Uneura et al.

(10) Patent No.: US 9,581,043 B2
(45) Date of Patent: Feb. 28, 2017

(54) TURBOCHARGER

(71) Applicant: IHI Corporation, Koto-ku (JP)

(72) Inventors: Yutaka Uneura, Tokyo (JP); Atsushi Koike, Tokyo (JP); Hideyuki Kojima, Tokyo (JP)

(73) Assignee: IHI Corporation, Koto-ku (JP)

( * ) Notice: Subject to any disclaimer, the term of this patent is extended or adjusted under 35 U.S.C. 154(b) by 454 days.

(21) Appl. No.: 14/080,989

(22) Filed: Nov. 15, 2013

(65) Prior Publication Data
US 2014/0140865 A1    May 22, 2014

(30) Foreign Application Priority Data

Nov. 21, 2012 (JP) .................... 2012-254941

(51) Int. Cl.
F04D 29/04 (2006.01)
F01D 25/16 (2006.01)
F04D 29/041 (2006.01)

(52) U.S. Cl.
CPC ........... F01D 25/16 (2013.01); F01D 25/166 (2013.01); F01D 25/168 (2013.01); F04D 29/0413 (2013.01); F05D 2220/40 (2013.01)

(58) Field of Classification Search
CPC .... F16C 17/047; F16C 2360/24; F01D 25/16; F01D 25/166; F01D 25/168;
(Continued)

(56) References Cited

U.S. PATENT DOCUMENTS 6,929,402 B1* 8/2005 Titus ............... F16C 17/10
384/107
6,976,788 B2* 12/2005 Honda ............. F16C 17/047
384/123
(Continued)

FOREIGN PATENT DOCUMENTS

CN    101509399 A    8/2009
JP    2009-216036 A    9/2009
(Continued)

OTHER PUBLICATIONS

Combined Chinese Office Action and Search Report issued Sep. 6, 2015 in Patent Application No. 201310585310.X (with English language translation).

*Primary Examiner* — Charles Freay
*Assistant Examiner* — Philip Stimpert
(74) *Attorney, Agent, or Firm* — Oblon, McClelland, Maier & Neustadt, L.L.P.

(57) ABSTRACT

A turbocharger includes: a thrust bearing fixed to a turbocharger main body; and a supply oil passage provided in the turbocharger main body to the thrust bearing. The thrust bearing includes: an insertion hole in which to insert the turbine shaft; pressure receiving portions displaced from one another in phase in a rotational direction of the turbine shaft, and each configured to form an oil film between the pressure receiving portion and the thrust collar to receive a thrust load by use of oil film pressure; and intervening portions each located between two of the pressure receiving portions adjacent in the rotational direction of the turbine shaft, and being further away from the thrust collar than the pressure receiving portions. The intervening portion vertically under the insertion hole at least partially has a surface further away from the thrust collar than the other intervening portions.

9 Claims, 4 Drawing Sheets (58) Field of Classification Search
CPC .. F05D 2220/40; F04D 29/04; F04D 29/0473; F04D 29/05; F04D 29/051; F04D 29/0513; F04D 29/057; F04D 29/041; F04D 29/0413; F04D 29/046; F02C 6/12
USPC ........................................................ 384/121
See application file for complete search history.

(56) References Cited

U.S. PATENT DOCUMENTS

| | | | |
|---|---|---|---|
| 2008/0085068 A1* | 4/2008 | Hemmi ................... | F16C 17/04 |
| | | | 384/105 |
| 2010/0139270 A1* | 6/2010 | Koch ....................... | F01D 25/16 |
| | | | 60/605.3 |
| 2010/0218499 A1 | 9/2010 | Shibui et al. | |

FOREIGN PATENT DOCUMENTS

| | | |
|---|---|---|
| JP | 2010-121589 | 6/2010 |
| JP | 2010-169066 A | 8/2010 |
| WO | WO 2009/095985 A1 | 8/2009 |

* cited by examiner

TURBOCHARGER

BACKGROUND OF THE INVENTION

1. Field of the Invention

The present invention relates to a turbocharger in which multiple pressure receiving portions provided in a thrust bearing receives a thrust load.

2. Description of the Related Art

A conventional turbocharger includes a turbine shaft whose ends are provided with turbine and compressor wheels (impellers), respectively. The turbine shaft is rotatably supported by a bearing housing. Such a turbocharger is connected to an engine. An exhaust gas discharged from the engine rotates the turbine wheel, and the rotation of the turbine wheel rotates the compressor wheel through the turbine shaft. The rotation of the compressor wheel compresses the air, and the compressed air is supplied to the engine.

A thrust bearing is placed opposite a thrust collar provided to the turbine shaft with the turbine shaft inserted in an insertion hole of the thrust bearing. The thrust bearing receives a load in the axial direction of the turbine shaft (thrust load) which acts on the turbine shaft. An opposed surface of the thrust bearing which is opposite the thrust collar is provided with multiple pressure receiving portions arranged in the circumferential direction of the turbine shaft, and each projecting from the opposed surface toward the thrust collar. Each pressure receiving portion forms an oil film between the pressure receiving portion and the thrust collar, and receives the thrust load by use of oil film pressure. After lubricating and cooling the thrust bearing, the lubricant is discharged via a discharge port or a cutout which is formed vertically below the insertion hole of the thrust bearing. A turbocharger described in Japanese Patent Application Laid-Open Publication No. 2010-121589 (Patent Document 1) is provided with a through-hole which penetrates through the thrust bearing from the insertion hole to the discharge port, and is thus configured to improve a performance to discharge a lubricant.

SUMMARY OF THE INVENTION

In the configuration of Patent Document 1 mentioned above, an inlet end of the through-hole for discharging the lubricant is opened to the insertion hole at a position closer to the wheel (impeller) than to the pressure receiving portion. Depending on the pressure for supplying the lubricant, the number of revolutions of the turbine shaft and the like, power of the lubricant flowing into the insertion hole increases in some cases. In such a case, part of the lubricant having entered the insertion hole is more likely to be guided toward the wheel (impeller) instead of flowing into the through-hole. For this reason, a further improvement in the oil discharging performance has been awaited.

An object of the present invention is to provide a turbocharger which is capable of improving a lubricant discharging performance of a thrust bearing therein.

An aspect of the present invention is a turbocharger comprising: a turbocharger main body; a turbine shaft rotatably housed in the turbocharger main body, and provided with a turbine wheel at an end of the turbine shaft, and a compressor wheel at an opposite end of the turbine shaft; a thrust collar configured to rotate integrally with the turbine shaft; a thrust bearing having an opposed surface which is fixed to the turbocharger main body while being set opposite the thrust collar in an axial direction of the turbine shaft; and a supply oil passage provided to the turbocharger main body, and configured to supply a lubricant to the opposed surface of the thrust bearing. Here, the thrust bearing includes: an insertion hole in which to insert the turbine shaft; multiple pressure receiving portions provided to be displaced from one another in phase in a rotational direction of the turbine shaft, each pressure receiving portion configured to form an oil film between the pressure receiving portion and the thrust collar to receive a thrust load by use of oil film pressure; and multiple intervening portions each located between the adjacent pressure receiving portions in the rotational direction of the turbine shaft, each intervening portion having an intervening surface which is opposite the thrust collar and is further away from the thrust collar than the corresponding pressure receiving portion. Moreover, the intervening surface of one of the intervening portions located vertically under the insertion hole at least partially has a surface being opposite the thrust collar and further away from the thrust collar than the intervening surfaces of the other intervening portions.

The one of the intervening portions located vertically under the insertion hole may include a groove formed to have, as a bottom surface, the surface which is opposite the thrust collar and is further away from the thrust collar than the intervening surfaces of the other intervening portions.

The groove in the intervening portion located vertically under the insertion hole may be formed at a position further rearward in the rotational direction of the turbine shaft than a center position of a width of the intervening portion in the rotational direction of the turbine shaft.

The groove may be formed continuous to the pressure receiving portion which is located further rearward in the rotational direction of the turbine shaft than the intervening portion located vertically under the insertion hole.

A width of the groove in the rotational direction of the turbine shaft may become gradually larger as the groove extends vertically downward.

In the thrust bearing, a discharge port forming a passage through which to discharge the lubricant having lubricated the pressure receiving portions may be formed in a place vertically lower than the intervening portion located vertically under the insertion hole.

The present invention can provide a turbocharger which is capable of improving a lubricant discharging performance of a thrust bearing therein.

DESCRIPTION OF THE PREFERRED EMBODIMENTS

Referring to the accompanying drawings, detailed descriptions will be hereinbelow provided for an embodiment of the present invention. Dimensions, materials and specific values and the like shown in the embodiment are provided just as examples for facilitating understanding of the invention. In other words, none of the dimensions, materials, specific values and the like are intended to limit the scope of the present invention unless so specified. Furthermore, in the specification and the drawings, components having substantially the same functions and configurations will be denoted by the same reference signs, and overlapped descriptions for such components will be omitted. In addition, the illustration of components not directly related to the present invention will be omitted.

Figure 1:
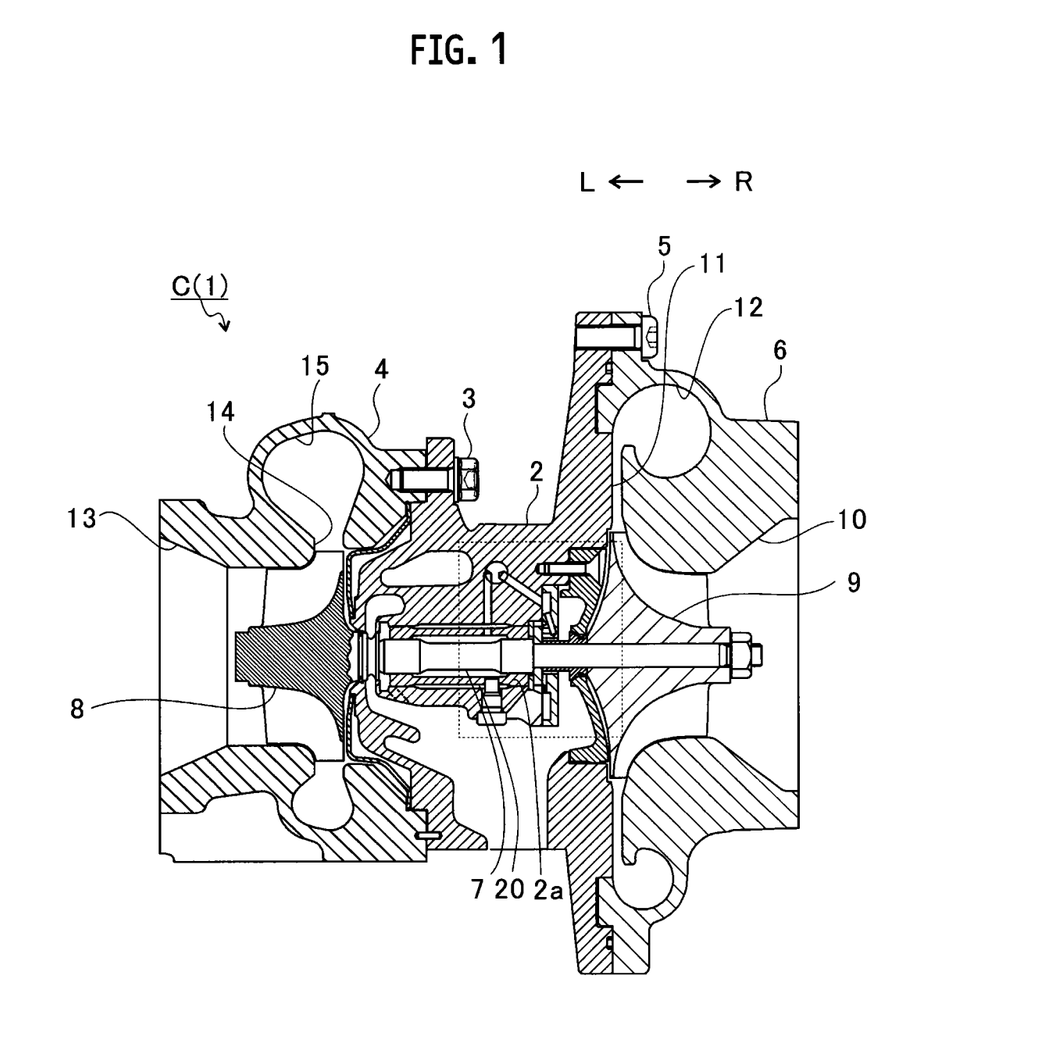
FIG. 1 is a schematic cross-sectional view of a turbocharger.

FIG. 1 is a schematic cross-sectional view of a turbocharger C. In the following description, a direction indicated with an arrow L in FIG. 1 is defined as a left side of the turbocharger C while a direction indicated with an arrow R therein is defined as a right side of the turbocharger C. As shown in FIG. 1, the turbocharger C includes a turbocharger main body 1. The turbocharger main body 1 is integrally formed from: a bearing housing 2; a turbine housing 4 connected to the left side of the bearing housing 2 by use of a fastening bolt 3; and a compressor housing 6 connected to the right side of the bearing housing 2 by use of a fastening bolt 5.

The bearing housing 2 is provided with a bearing hole 2a penetrating through the bearing housing 2 in the left-right direction of the turbocharger C (in the axial direction of a turbine shaft 7). The turbine shaft 7 is rotatably supported by the bearing housing 2. A turbine wheel (turbine impeller) 8 is integrally fixed to the left end portion (one end) of the turbine shaft 7. The turbine wheel 8 is rotatably housed in the turbine housing 4. In addition, a compressor wheel (compressor impeller) 9 is integrally fixed to the right end portion (opposite end) of the turbine shaft 7. The turbine wheel 9 is rotatably housed in the compressor housing 6.

An inlet port 10 is formed in the compressor housing 6. The inlet port 10 is opened on the right side of the turbocharger C and is connected to an air cleaner (not illustrated). In addition, with the bearing housing 2 and the compressor housing 6 connected together by the fastening bolt 5, the opposed surfaces of the two housings 2, 6 collectively form a diffuser passage 11 configured to raise the pressure of the air. The diffuser passage 11 extends from the inside to the outside in the radial direction of the turbine shaft 7 (the compressor wheel 9), and is shaped like a ring. The inner side of the diffuser passage 11 in the radial direction communicates with the inlet port 10 via the compressor wheel 9.

Furthermore, the compressor housing 6 is provided with a compressor scroll passage 12. The compressor scroll passage 12 is shaped like a ring, and is located outward of the diffuser passage 11 in the radial direction of the turbine shaft 7 (the compressor wheel 9). The compressor scroll passage 12 communicates with an intake port of the engine (not illustrated), and also communicates with the diffuser passage 11. For this reason, when the compressor wheel 9 rotates, a fluid is sucked into the compressor housing 6 from the inlet port 10, then the pressure of the sucked fluid is raised by the diffuser passage 11 and the compressor scroll passage 12, and the resultant fluid is guided to the intake port of the engine.

An outlet port 13 is formed in the turbine housing 4. The outlet port 13 is opened on the left side of the turbocharger C and is connected to an exhaust gas purifier (not illustrated). In addition, the turbine housing 4 is provided with a passage 14 and a turbine scroll passage 15. The turbine scroll passage 15 is shaped like a ring, and is located outward of the passage 14 in the radial direction of the turbine shaft 7 (the turbine wheel 8). The turbine scroll passage 15 communicates with a gas inlet port to which the exhaust gas discharged from an exhaust manifold of the engine (not illustrated) is guided. Furthermore, the turbine scroll passage 15 communicates with the passage 14 as well. For these reasons, the exhaust gas guided to the turbine scroll passage 15 from the gas inlet port is guided to the outlet port 13 via the passage 14 and the turbine wheel 8, and rotates the turbine wheel 8 in the course of its flow. Thus, the rotary force of the turbine wheel 8 is transmitted to the compressor wheel 9 via the turbine shaft 7. Consequently, as described above, the rotary force of the compressor wheel 9 raises the pressure of the fluid, and guides the fluid to the intake port of the engine.

Figure 2:
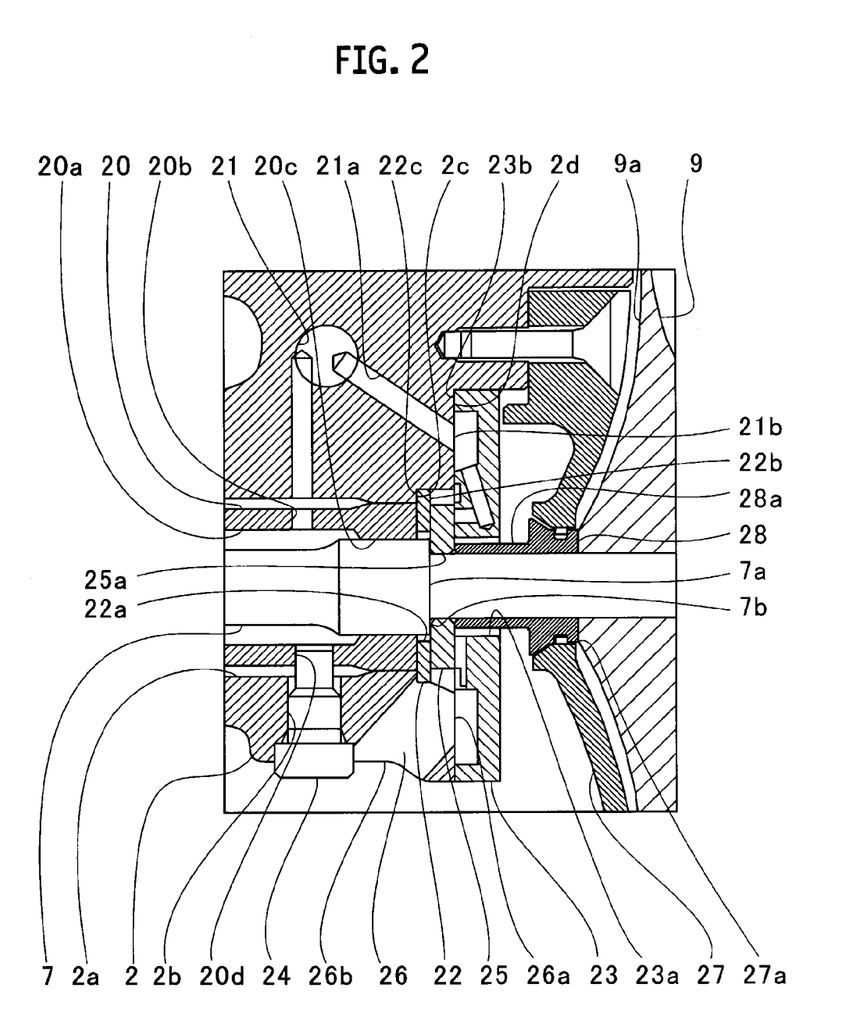
FIG. 2 is a partially magnified view of the inside of a bearing housing shown in FIG. 1.

FIG. 2 is a partially magnified view of the inside of the bearing housing 2 in FIG. 1, which shows the section surrounded by the dotted line therein. Referring to FIG. 2, descriptions will be provided for a bearing structure which rotatably supports the turbine shaft 7.

A supply oil passage 21 is formed from a hole provided in the bearing housing 2. The supply oil passage 21 penetrates into the inside of the bearing housing 2 from the outside, and supplies a lubricant to a semi-floating metal 20 placed in the bearing hole 2a and to thrust bearings 22, 23 which will be described later.

The semi-floating metal 20 is an annular member having a shaft hole 20a which penetrates through the semi-floating metal 20 in the axial direction of the turbine shaft 7. The turbine shaft 7 is inserted into the shaft hole 20a. In addition, a hole 20b penetrating through the semi-floating metal 20 from the inner peripheral surface (the shaft hole 20a) to the outer peripheral surface is formed in the semi-floating metal 20.

The lubricant is supplied to the bearing hole 2a via the supply oil passage 21, and part of the lubricant flows into a space between the outer peripheral surface of the semi-floating metal 20 and the bearing hole 2a. The lubricant flowing into the space plays roles in things such as cooling the bearing housing 2 and lubricating the thrust bearing 22. The rest of the lubricant flows into the hole 20b of the semi-floating metal 20, and is guided to the inner peripheral surface of the semi-floating metal 20.

A radial bearing surface 20c is provided on the inner peripheral surface of the semi-floating metal 20. The radial bearing surface 20c retains an oil film between the radial bearing surface 20c and the turbine shaft 7 by use of the lubricant flowing in via the hole 20b, and receives the load of the turbine shaft 7 in the radial direction of the turbine shaft 7 by use of the oil film pressure.

Furthermore, the semi-floating metal 20 is provided with a pin hole 20d which penetrates through the semi-floating metal 20 in a direction perpendicular to the axial direction of the turbine shaft 7. Moreover, a screw hole 2b is formed in the bearing housing 2. The screw hole 2b penetrates through the bearing housing 2 from the outside to the inside in the radial direction of the bearing hole 2a. In addition, the screw hole 2b is opposite the pin hole 20d of the semi-floating metal 20 housed in the bearing hole 2a.

A screw thread is formed on a part of a pin 24, and the pin 24 threadedly engages with the screw hole 2b. The front end portion of the pin 24 is inserted into the pin hole 20d of the semi-floating metal 20. This restricts the movement of the semi-floating metal 20 relative to the bearing hole 2a in the rotational and axial directions of the turbine shaft 7.

A thrust collar 25 is provided with a fixation hole 25a into which to insert the turbine shaft 7. With the turbine shaft 7 inserted in the fixation hole 25a, the thrust collar 25 is fixed to a part of the turbine shaft 7 between the semi-floating metal 20 and the compressor wheel 9. Accordingly, the thrust collar 25 rotates integrally with the turbine shaft 7.

The thrust bearing 22 is placed on a turbine wheel 8 side of the thrust collar 25 in the axial direction, while the thrust bearing 23 is placed on a compressor wheel 9 side of the thrust collar 25 in the axial direction. The thrust bearings 22, 23 receive the load of the turbine shaft 7 in the axial direction (thrust load). The thrust bearing 22 includes an insertion hole 22a which penetrates through the thrust bearing 22 in the axial direction of the turbine shaft 7. The thrust bearing 23 similarly includes an insertion hole 23a which penetrates through the thrust bearing 23 in the axial direction of the turbine shaft 7. The turbine shaft 7 is inserted into the insertion holes 22a, 23a. The turbine shaft 7 rotates relative to the thrust bearings 22, 23.

The bearing housing 2 has a fitting surface 2c on its compressor wheel 9 side. The fitting surface 2c is formed as a surface perpendicular to the axial direction of the turbine shaft 7. The bearing hole 2a is formed in the fitting surface 2c.

The thrust bearing 22 includes: an opposed surface 22b which is opposite the thrust collar 25; and a surface 22c which is on the opposite side of the thrust bearing 22 from the opposed surface 22b. With the opposed surface 22b set opposite the thrust collar 25 in the axial direction of the turbine shaft 7, the thrust bearing 22 is fixed to the bearing housing 2. To put it specifically, the surface 22c is brought into face-to-face contact with, and fixed to, the fitting surface 2c of the bearing housing 2.

Furthermore, the bearing housing 2 has a fixation surface 2d on its compressor wheel 9 side. The fixation surface 2d is formed as a surface perpendicular to the axial direction of the turbine shaft 7 between the fitting surface 2c and the compressor wheel 9.

The thrust bearing 23 includes an opposed surface 23b whose part is opposite the thrust collar 25. With the opposed surface 23b set opposite the thrust collar 25 in the axial direction of the turbine shaft 7, the thrust bearing 23 is fixed to the bearing housing 2. To put it specifically, the opposed surface 23b of the thrust bearing 23 is fixed to the fixation surface 2d of the bearing housing 2.

The supply oil passage 21 includes a branch passage 21a which branches off from the passage communicating with the bearing hole 2a. The branch passage 21a includes an outlet end 21b which is opened on the fixation surface 2d of the bearing housing 2. The branch passage 21a supplies the lubricant to the opposed surface 23b of the thrust bearing 23.

Moreover, of the lubricant supplied from the supply oil passage 21, a portion having flowed via the semi-floating metal 20 side, and another portion having been supplied to the thrust bearing 23 side are supplied to the thrust bearing 22 and the thrust collar 25.

A discharge oil passage 26 includes an inlet end 26a and an outlet end 26b. The inlet end 26a is formed in the fixation surface 2d of the bearing housing 2 at a portion vertically below the outlet end 21b of the supply oil passage 21 (in the lower portion of the FIG. 2). The outlet end 26b is opened vertically downward from the bearing housing 2. Accordingly, the lubricant lubricates the thrust bearings 22, 23 and the thrust collar 25, and then is discharged vertically downward.

A seal plate 27 includes a center hole 27a into which to insert the turbine shaft 7. With the turbine shaft 7 inserted in the center hole 27a, the seal plate 27 is placed opposite a rear surface 9a of the compressor wheel 9.

An oil slinger 28 includes a cylindrical main body portion 28a into which to insert the turbine shaft 7. The oil slinger 28 is fixed to the turbine shaft 7 with one end of the main body portion 28a inserted in the insertion hole 23a of the thrust bearing 23 and an end surface of the one end in contact with the thrust collar 25. What is more, the other end of the main body portion 28a has a dimension (structure) which allows the other end thereof to be inserted into the center hole 27a of the seal plate 27 in a non-contact manner.

In addition, the oil slinger 28 rotates integrally with the turbine shaft 7, and scatters the lubricant leaking from the bearing housing 2 in the radial direction of the turbine shaft 7 by centrifugal force attributed to the rotation of the turbine shaft 7, thus preventing the lubricant from reaching the rear surface 9a of the compressor wheel 9 from the center hole 27a of the seal plate 27.

Furthermore, the turbine shaft 7 is provided with a step portion 7a. The step portion 7a is a step located in a boundary area formed in a way that: the outer diameter of a turbine wheel 8 side of the turbine shaft 7 is larger than the inner diameter of the fixation hole 25a of the thrust collar 25; and the outer diameter of a compressor wheel 9 side of the turbine shaft 7 is smaller than the inner diameter of the fixation hole 25a of the thrust collar 25. The step portion 7a is formed by use of the difference between the outer diameters of the turbine shaft 7, and includes a surface 7b perpendicular to the axial direction of the turbine shaft 7. The turbine shaft 7 is inserted into fixation hole 25a until the surface 7b comes into contact with the thrust collar 25.

An interval between the two thrust bearing 22, 23 is set at a value which is slightly larger than the thickness of the thrust collar 25 in the axial direction of the turbine shaft 7. Accordingly, when the turbine shaft 7 moves in its axial direction, each of the thrust bearings 22, 23 receives the corresponding load from the thrust collar 25 through the oil film. In other words, the thrust bearing 22, 23 support both leftward and rightward thrust loads in the axial direction of the turbine shaft 7.

Figure 3A:
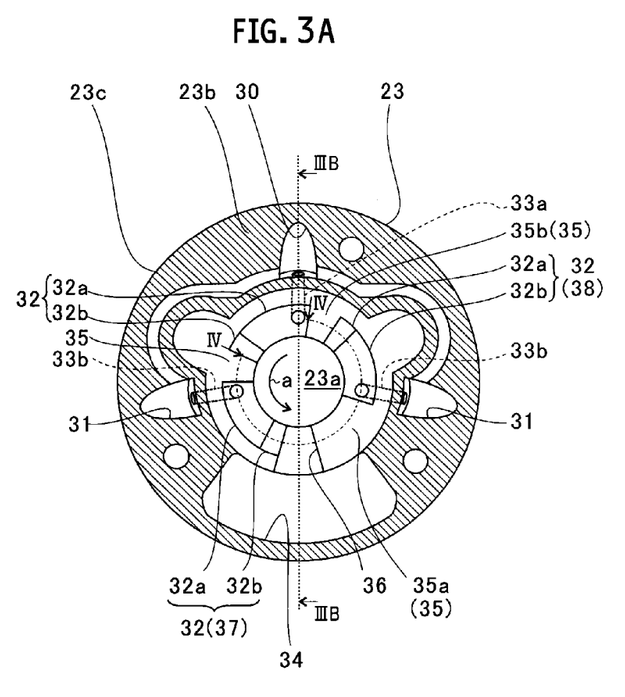
FIGS. 3A and 3B are explanatory diagrams for explaining the structure of a thrust bearing placed on a compressor wheel side.
Figure 3B:
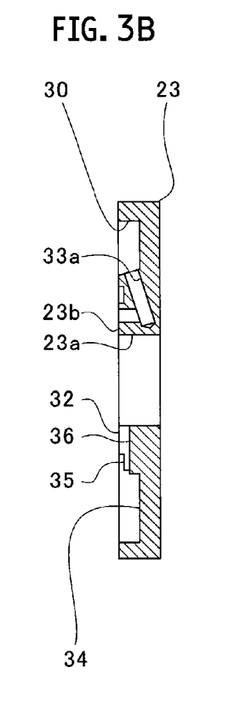

FIGS. 3A and 3B are explanatory diagrams for explaining the structure of the thrust bearing 23 placed on the compressor wheel 9 side. FIG. 3A is a front view of an opposed surface 23b side of the thrust bearing 23. FIG. 3B is a cross-sectional view of the thrust bearing 23 taken along the IIIB-IIIB line of FIG. 3A. In FIG. 3A, the surface of the thrust bearing 23 in contact with the fixation surface 2d of the bearing housing 2, and portions which are flush with the surface in contact are hatched for the sake of easier understanding.

A supply hole 30 is formed in the opposed surface 23b of the thrust bearing 23. The supply hole 30 is opened opposite the outlet end 21b of the supply oil passage 21. The lubricant is guided to the supply hole 30 from the supply oil passage 21.

One or more (in the embodiment, two) relay holes 31 are formed in the opposed surface 23b. The relay holes 31 are provided at positions displaced from the supply hole 30 in phase in the rotational direction of the turbine shaft 7 (indicated with an arrow a in FIG. 3A). With the fixation surface 2d and the opposed surface 23b in contact with each other, the relay holes 31 each communicates with the supply hole 30 on the opposed surface 23b, and through grooves formed along the outer periphery of a recess in which pressure receiving portions 32 (described later) are provided. The lubricant is guided to each of the relay holes 31 from the supply hole 30 through the corresponding grooves.

The thrust bearing 23 is further provided with multiple (in the embodiment, three) pressure receiving portions (pads) 32. The pressure receiving portions 32 are each shaped like a sector, and are displaced from one another in phase in the rotational direction of the turbine shaft 7. Each pressure receiving portion 32 forms an oil film between the pressure receiving portion 32 and the thrust collar 25, and receives the thrust load by use of oil film pressure.

Figure 4:
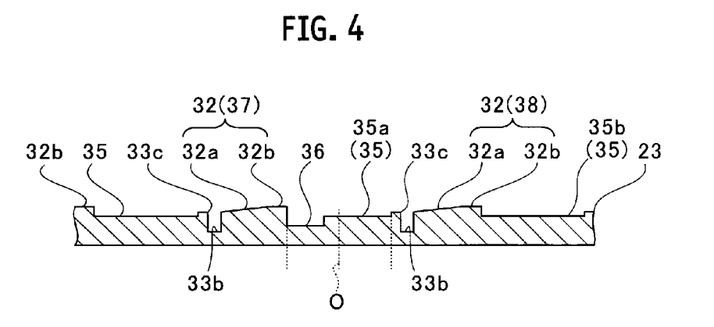
FIG. 4 is a cross-sectional view of the structure of the thrust bearing taken along the IV-IV line of FIG. 3A.

FIG. 4 is a cross-sectional view taken along the IV-IV line of FIG. 3A. It should be noted that only the contour line of the cross section of the thrust bearing 23 along the IV-IV line is shown therein.

Each pressure receiving portion 32 is formed from: a taper portion 32a inclined to a surface perpendicular to the axial direction (the vertical direction in FIG. 4) of the turbine shaft 7; and a land portion 32b (a sliding surface) parallel to the surface perpendicular to the turbine shaft 7. In other words, the thrust bearing 23 is formed from the taper land-shaped sliding bearing. It should be noted that the inclination angle of each taper portion 32a to the surface perpendicular to the turbine shaft 7 is exaggerated for the sake of easier understanding in FIG. 4.

As shown in FIGS. 3A and 3B, an introducing passage 33a is a hole provided in the inside of the thrust bearing 23. The introducing passage 33a makes the supply hole 30 communicate with the corresponding pressure receiving portion 32 which is provided inward of the supply hole 30 in the radial direction, and guides the lubricant, which has been guided to the supply hole 30, to the pressure receiving portion 32.

Similarly, each introducing passage 33b makes the corresponding relay hole 31 communicate with the corresponding pressure receiving portion 32 which is provided inward of the relay hole 31 in the radial direction, and guides the lubricant, which has been guided to the relay hole 31, to the pressure receiving portion 32.

In addition, outlet ends 33c of the introducing passages 33a, 33b are formed in the taper potions 32a of the pressure receiving portions 32, respectively. Each outlet end 33c is located on the side of the taper portion 32a (on the rear side of the taper portion 32a in the rotational direction of the turbine shaft 7, which is the left side in FIG. 4) opposite the side that continues to the land portion 32b. The lubricant is guided from each outlet end 33c onto the corresponding taper portion 32a, and is distributed entirely to the corresponding pressure receiving portion 32 with the rotation of the thrust collar 25. After lubricating the pressure receiving portions 32, the lubricant flows vertically downward (downward in FIGS. 3A and 3B) with gravity.

As shown in FIGS. 3A and 3B, a discharge port 34 is formed in the thrust bearing 23 at a position vertically under the insertion hole 23a. The discharge port 34 is opened opposite the inlet end 26a of the discharge oil passage 26 (see FIG. 2). The lubricant having lubricated the pressure receiving portions 32 flows into the discharge port 34. Thereafter, the lubricant is discharged through the discharge oil passage 26. In other words, the discharge port 34 constitutes a passage for guiding the lubricant to the discharge oil passage 26.

Furthermore, in the opposed surface 23b, an area surrounding the pressure receiving portions 32 forms the recess which is lower than, and further away from the thrust collar 25 than the pressure receiving portions 32. In this respect, of the recess, portions between neighboring pairs of the pressure receiving portions 32 in the rotational direction of the turbine shaft 7, or in other words, portions displaced from the pressure receiving portions 32 in phase in the rotational direction of the turbine shaft 7, will be each referred to as an intervening portion 35.

The intervening portions 35 have surfaces (intervening surfaces) which are opposite the thrust collar 25. The intervening surfaces are further away from the thrust collar 25 than the pressure receiving portions 32 in a way that the intervening surfaces are dented from the pressure receiving portions 32. In this embodiment, since three pressure receiving portions 32 are provided to the thrust bearing 23, three intervening portions 35 are also provided between the pressure receiving portions 32. In the following descriptions, of the multiple intervening portions 35, the intervening portion 35 located vertically below the insertion hole 23a, or the intervening portion 35 located immediately above the discharge port 34, will be denoted by reference sign 35a; and the intervening portion 35 located forward of the intervening portion 35a in the rotational direction of the turbine shaft 7 will be denoted by reference sign 35b. Furthermore, in FIGS. 3A and 3B as well as FIG. 4, the pressure receiving portion 32 located rearward of the intervening portion 35a in the rotational direction of the turbine shaft 7 will be denoted by reference sign 37; and the pressure receiving portion 32 located forward of the intervening portion 35a in the rotational direction of the turbine shaft 7 will be denoted by reference sign 38.

As shown in FIG. 3A, the intervening portion 35a is located between the insertion hole 23a and the discharge port 34. In other words, the intervening portion 35a is provided vertically under the insertion hole 23a, and the discharge port 34 is provided in a place vertically lower than the intervening portion 35a. After lubricating and cooling the thrust bearing 23, the lubricant flows into the intervening port 35a via the insertion hole 23a, and from the pressure receiving portion 37 with the rotation of the thrust collar 25. The intervening portion 35a plays a role in guiding the lubricant, which has flowed into the intervening portion 35a as described above, to the discharge port 34.

As shown in FIG. 4, at least a part of the intervening surface of the intervening portion 35a is a particular surface which is opposite the thrust collar 25 and is further away from the thrust collar 25 than the intervening surfaces of the other intervening portions 35. To put it specifically, a groove 36 having the particular surface as a bottom surface is formed in the intervening portion 35a.

The groove 36 is formed in the intervening surface of the intervening portion 35a to extend in the radial direction of the thrust bearing 23. The formation of the groove 36 increases the cross-sectional area of the passage from the insertion hole 23a to the discharge port 34, and improves the oil discharging performance of the thrust bearing 23. The effect of the improvement in the oil discharging performance is particularly evident when the rotation rate of the turbine shaft 7 is low.

The conventional configuration discharges the lubricant from its compressor wheel 9 side via the insertion hole 23a. In contrast, the configuration of the embodiment discharges the lubricant via the turbine wheel 8 side of the thrust bearing 23. For this reason, the configuration of the embodiment reduces the amount of outflow of the lubricant to its compressor wheel 9 side, and improves the performance of discharging the lubricant vertically downward as compared to the conventional configuration.

Furthermore, the configuration of the embodiment can form the component while providing the groove 36 in advance by casting, sintering and so on, in contrast to the conventional configuration disclosed in Patent Document 1, which is configured to discharge the lubricant through the holes provided in the thrust bearing 23. Accordingly, the configuration of the embodiment makes it possible to reduce processing costs and material costs as compared to the conventional configuration.

Since the groove 36 has the large passage cross section, the amount of lubricant flowing through the groove 36 is larger than the amount of lubricant flowing through the rest of the intervening portion 35a. For this reason, if the groove 36 were formed further forward in the rotational direction of the turbine shaft 7 (rightward in FIG. 4), part of the lubricant guided to the groove 36 would reach the pressure receiving portion 38 along with an increase in the rotation rate of the turbine shaft 7, and hence the lubricant would not be sufficiently discharged vertically downward. In this case, the oil discharge performance would be reduced when the rotation rate of the turbine shaft 7 is high.

Accordingly, in the embodiment, the groove 36 is formed in the intervening portion 35a at the position further rearward (leftward in FIG. 4) in the rotational direction of the turbine shaft 7 than the center line O, indicated with the dotted line in FIG. 4, of the width of the intervening portion 35a in the rotational direction of the turbine shaft 7 (in the left-right direction in FIG. 4). When the groove 36 is formed rearward in the rotational direction of the turbine shaft 7 in this manner, it is possible to restrain the lubricant from reaching the pressure receiving portion 38 from the groove 36.

Furthermore, the groove 36 is formed continuous to the pressure receiving portion 37. To put it specifically, at the rear of the groove 36 in the rotational direction of the turbine shaft 7, the groove 36 is contiguous to the pressure receiving portion 37. In other words, a sidewall of the groove 36 forms an end surface of the pressure receiving portion 37 in the rotational direction of the turbine shaft 7.

When the groove 36 is formed contiguous to the pressure receiving portion 37 in this manner, it is possible to restrain the lubricant from reaching the pressure receiving portion 38 from the groove 36. Moreover, it is possible to make the width of the groove 36 in the rotational direction of the turbine shaft 7 as large as possible, and to improve the oil discharging performance.

In addition, the width of the groove 36 in the rotational direction of the turbine shaft 7 becomes gradually larger as the groove 36 extends vertically downward. In other words, the groove 36 is shaped like a sector. Since the groove 36 is shaped like a sector as described above, it is possible to limit the pressure loss which takes place when the lubricant collides against the wall surfaces of the groove 36, and to further improve the oil discharging performance.

(Modification)

Figure 5:
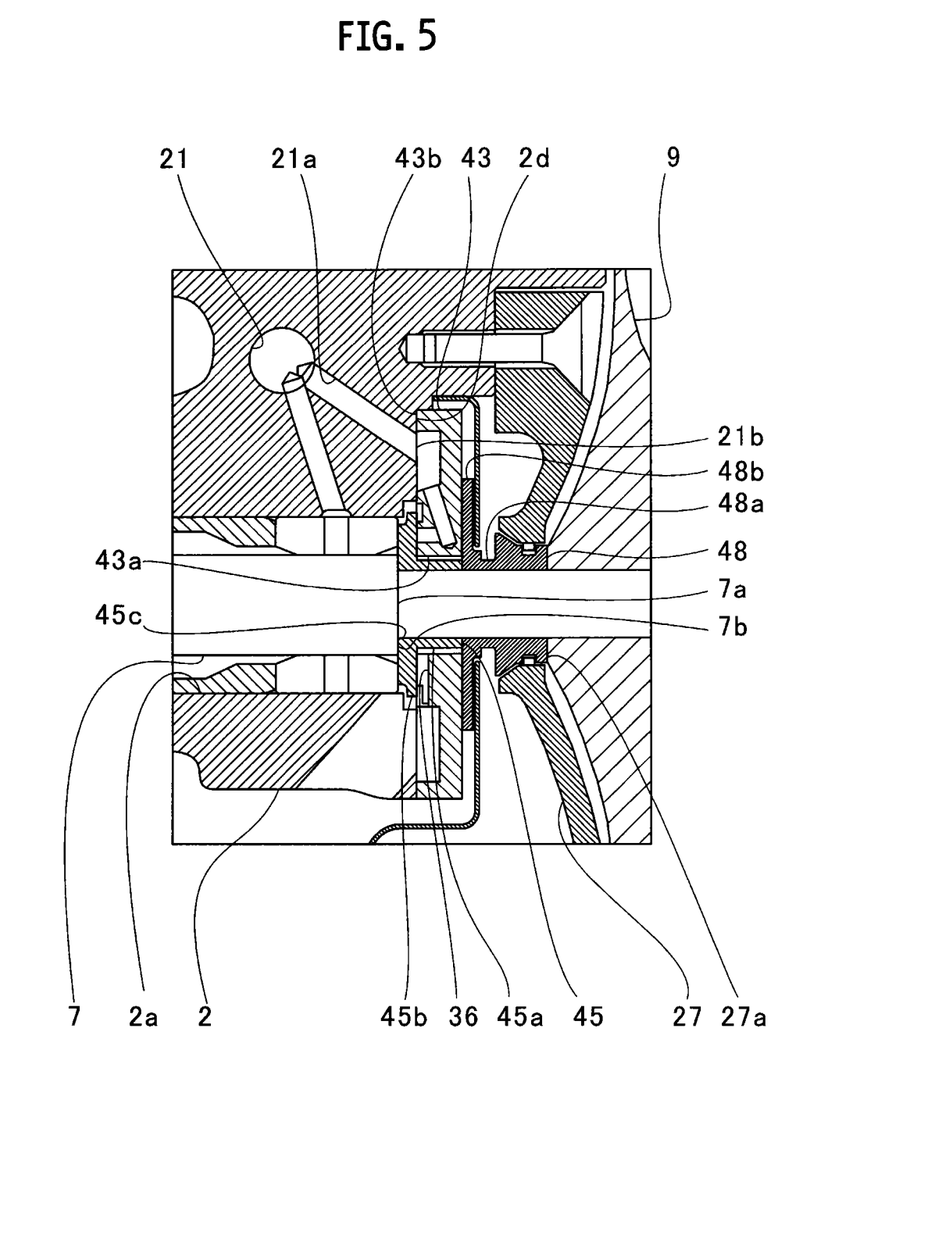
FIG. 5 is a partially magnified view of the inside of a bearing housing of a modification, which corresponds to FIG. 2.

FIG. 5 is a partially magnified view of the inside of a bearing housing of a modification, which corresponds to FIG. 2. The foregoing descriptions have been provided for the embodiment in which the two thrust bearings 22, 23 are arranged with the thrust collar 25 interposed in between. In the modification, as shown in 5, a thrust collar 45 and an oil slinger member 48 are arranged with a thrust bearing 43 interposed in between. It should be noted that components which are the same as those of the foregoing embodiment will be denoted by the same reference signs, and detailed descriptions for such components will be omitted.

The thrust collar 45 includes: a cylindrical main body portion 45a; and a large-diameter portion 45b formed integrally with an end of the main body portion 45b, and having a diameter which is larger than that of the main body portion 45a. A fixation hole 45c is formed around the center axis of the thrust collar 45, penetrating through the main body portion 45a and the large-diameter portion 45b. The thrust collar 45 is fixed to the turbine shaft 7 with the large-diameter portion 45b facing the turbine wheel 8, and with the turbine shaft 7 inserted in the fixation hole 45c. The turbine shaft 7 is inserted into the fixation hole 45c until the thrust collar 45 comes into contact with the above-mentioned surface 7b.

The thrust bearing 43 includes an insertion hole 43a which penetrates through the thrust bearing 43 in the axial direction of the turbine shaft 7. The main body portion 45a of the thrust collar 45 is inserted in the inserting hole 43a. For this reason, the turbine shaft 7 and the thrust bearing 43 rotate relative to each other.

Furthermore, the thrust bearing 43 has an opposed surface 43b which is opposite the large-diameter portion 45b of the thrust bearing 45 in the axial direction of the turbine shaft 7. The opposed surface 43b is in face-to-face contact with the fixation surface 2d of the bearing housing 2. The branch passage 21a of the supply oil passage 21 includes the outlet end 21b which is opened to the fixation surface 2d of the bearing housing 2. The lubricant is discharged through the outlet end 21b, and is supplied to the opposed surface 43b of the thrust bearing 43.

The oil slinger member 48 includes: a cylindrical main body portion 48a; and a large-diameter portion 48b formed integrally with an end of the main body portion 48a, and having a diameter which is larger than that of the main body portion 48a. The turbine shaft 7 is inserted in a hole formed around the center axis of the oil slinger member 48 and penetrating through the main body 48a and the large-diameter portion 48b. The oil slinger member 48 is fixed to the turbine shaft 7 with the end surface of the oil slinger member 48's end, at which the large-diameter portion 48b is formed, in contact with the thrust collar 45. Moreover, the opposite end of the main body portion 48a has a dimension (structure) which allows the opposite end thereof to be inserted into the center hole 27a of the seal plate 27.

The thrust bearing 43 is interposed between the large-diameter portion 45b of the thrust collar 45 and the large-diameter portion 48b of the oil slinger member 48. The space between the large-diameter 45b of the thrust collar 45 and the large-diameter 48b of the oil slinger member 48 is set at a value which is slightly larger than the thickness of the thrust bearing 43 in the axial direction of the turbine shaft 7. For this reason, when the turbine shaft 7 moves in its axial direction, the thrust bearing 43 receives a load from the thrust collar 45 or the oil slinger member 48 through the oil film. In other words, the thrust bearing 43 supports both leftward and rightward thrust loads in the axial direction of the turbine shaft 7.

It should be noted that the configuration of the thrust bearing 43 is the same as that of the first embodiment, which is shown in FIGS. 3A to 4. To put it specifically, the groove 36 is formed in the intervening portion 35a, located vertically under the insertion hole 23a, in the direction in which the bottom surface of the groove 36 is far away from the thrust collar 45. For this reason, the oil discharging performance is improved as in the case of the foregoing embodiment.

In the foregoing embodiment and modification, the discharge oil passage 26 is formed in the bearing housing 2, and the discharge port 34 is formed in the thrust bearing 23. Instead of the discharge port 34, however, a cutout through which to discharge the lubricant may be formed in a region located vertically under the thrust bearing 23 without providing the discharge oil passage 26 or the discharge port 34.

Furthermore, in the foregoing embodiment and modification, as a consequence of forming the groove 36, part of the intervening surface of the intervening portion 35a is further away from the thrust collars 25, 45 than the intervening surfaces of the other intervening portions 35. Instead of forming the groove 36, the intervening portion 35a may be dented deeper than the other intervening portions 35 in a way that the entire intervening portion 35a is further away from the thrust collars 25, 45 than the other intervening portions 35.

Moreover, in the foregoing embodiment, the groove 36 is formed in the intervening portion 35a at a position further rearward in the rotational direction of the turbine shaft 7 than the center position of the width of the intervening portion 35a in the rotational direction of the turbine shaft 7. Instead, however, the groove 36 may be formed further forward in the rotational direction of the turbine shaft 7 than the center position in the rotational direction of the turbine shaft 7.

What is more, the foregoing descriptions have been provided for the embodiment in which the groove 36 continues to the pressure receiving portion 37 in the rotational direction of the turbine shaft 7. Instead, however, a space may be provided between the groove 36 and the pressure receiving portion 37. In other words, an intervening surface may be provided between the groove 36 and the pressure receiving portion 37.

Furthermore, in the foregoing embodiment, the width of the groove 36 in the rotational direction of the turbine shaft 7 becomes gradually larger as the groove 36 extends vertically downward. Instead, the width thereof may be set constant, or may become gradually smaller as the groove 36 extends vertically downward.

In addition, the bottom surface of the groove 36 may be flat or curved. Here, the flat bottom surface is formed by square end mill machining, for example, while the curved bottom surface is formed by ball end mill machining, for example.

In the foregoing embodiment and modification, the "vertically downward" means a direction in which the gravity acts on the turbocharger C installed in a vehicle or the like which is placed on the horizontal surface. In FIGS. 1, 2, 3A, 3B and 5, the "vertically downward" means a downward direction in each of the drawings.

The foregoing descriptions have been provided for the preferable embodiment of the present invention by referring to the attached drawings. Needless to say, the present invention is not limited to such an embodiment. It is obvious to those skilled in the art that various modifications an d changes can be made within the scope described in the claims. It shall be understood that such modifications and changes naturally pertain to the technical scope of the present invention.

The present invention can be used for a turbocharger which receives a thrust load by use of multiple power receiving portions provided in a thrust bearing.

What is claimed is:

1. A turbocharger comprising:
a turbocharger main body;
a turbine shaft rotatably housed in the turbocharger main body, and provided with a turbine wheel at an end of the turbine shaft, and a compressor wheel at an opposite end of the turbine shaft;
a thrust collar fixed to the turbine shaft;
a thrust bearing having an opposed surface which is fixed to the turbocharger main body while being set opposite the thrust collar in an axial direction of the turbine shaft; and
a supply oil passage provided in the turbocharger main body, and configured to supply a lubricant to the opposed surface of the thrust bearing, wherein
the thrust bearing includes:
an insertion hole in which to insert the turbine shaft;
a plurality of pressure receiving portions provided to be displaced from one another in phase in a rotational direction of the turbine shaft, each pressure receiving portion configured to form an oil film between the pressure receiving portion and the thrust collar to receive a thrust load by use of oil film pressure, each pressure receiving portion including: a taper portion inclined to a surface perpendicular to an axial direction of the turbine shaft and a land portion parallel to the surface perpendicular to the axial direction of the turbine shaft; and
a plurality of intervening portions each located between the adjacent pressure receiving portions in the rotational direction of the turbine shaft, each intervening portion having an intervening surface which is opposite the thrust collar and is further away from the thrust collar than the corresponding pressure receiving portion,
the intervening portions are formed of a first intervening portion located under the insertion hole in a direction of gravity and at least one second intervening portion as the rest of the intervening portions, and
the intervening surface of the first intervening portion at least partially has a surface being opposite the thrust collar and further away from the thrust collar than the intervening surfaces of the second intervening portions.

2. The turbocharger according to claim 1, wherein the first intervening portion includes a groove formed to have, as a bottom surface, the surface which is opposite the thrust collar and is further away from the thrust collar than the intervening surfaces of the at least one second intervening portion.

3. The turbocharger according to claim 2, wherein the groove in the first intervening portion is formed at a position further rearward in the rotational direction of the turbine shaft than a center position of a width of the intervening portion in the rotational direction of the turbine shaft.

4. The turbocharger according to claim 3, wherein the groove is formed continuous to the pressure receiving portion which is located further rearward in the rotational direction of the turbine shaft than the first intervening portion.

5. The turbocharger according to claim 2, wherein a width of the groove in the rotational direction of the turbine shaft becomes gradually larger as the groove extends outward in a radial direction of the thrust bearing.

6. The turbocharger according to claim 3, wherein a width of the groove in the rotational direction of the turbine shaft becomes gradually larger as the groove extends outward in a radial direction of the thrust bearing.

7. The turbocharger according to claim 4, wherein a width of the groove in the rotational direction of the turbine shaft becomes gradually larger as the groove extends outward in a radial direction of the thrust bearing.

8. The turbocharger according to claim 1, wherein the thrust bearing includes a discharge port located lower than the first intervening portion in the direction of gravity, the discharge port forming a passage to which the lubricant having lubricated the pressure receiving portions is discharged.

9. The turbocharger according to claim 8, wherein the intervening surface of the first intervening portion extends from an inner surface of the insertion hole to the discharge port.

* * * * *